(12) United States Patent
Hashemi et al.

(10) Patent No.: US 11,490,266 B2
(45) Date of Patent: Nov. 1, 2022

(54) PLANNING DEPLOYMENT OF A NODE IN A COMMUNICATIONS NETWORK WITH A DRONE

(71) Applicant: Telefonaktiebolaget LM Ericsson (publ), Stockholm (SE)

(72) Inventors: Mona Hashemi, Ottawa (CA); Mikael Coldrey, Borås (SE); Jonas Fridén, Mölndal (SE); Lars Manholm, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 51 days.

(21) Appl. No.: 16/617,023

(22) PCT Filed: May 31, 2017

(86) PCT No.: PCT/EP2017/063132
§ 371 (c)(1),
(2) Date: Nov. 26, 2019

(87) PCT Pub. No.: WO2018/219443
PCT Pub. Date: Dec. 6, 2018

(65) Prior Publication Data
US 2021/0136595 A1     May 6, 2021

(51) Int. Cl.
*H04W 16/18*     (2009.01)
*B64C 39/02*     (2006.01)
(Continued)

(52) U.S. Cl.
CPC ........... *H04W 16/18* (2013.01); *B64C 39/024* (2013.01); *H04W 24/02* (2013.01); *H04W 24/10* (2013.01);
(Continued)

(58) Field of Classification Search
CPC ........ B64C 2201/027; B64C 2201/122; B64C 39/024; H04W 24/02; H04W 24/10; H04W 16/18
(Continued)

(56) References Cited

U.S. PATENT DOCUMENTS

2014/0355476 A1\* 12/2014 Anderson ............. H04W 24/02
370/254
2015/0312774 A1\* 10/2015 Lau ........................ H04W 24/10
455/446
(Continued)

FOREIGN PATENT DOCUMENTS

WO     2017011412 A1     1/2017
WO     2017063695 A1     4/2017

OTHER PUBLICATIONS

FCC DOC-347449A1 FCC Fact Sheet (Year: 2017).\*
(Continued)

*Primary Examiner* — William Nealon
(74) *Attorney, Agent, or Firm* — Rothwell, Figg, Ernst & Manbeck, P.C.

(57) ABSTRACT

A method (20) of planning deployment of a node (2c) in a communications network (1) is disclosed. The method (20) is performed by an unmanned aerial vehicle (3) and comprises: flying (21) to a candidate location (c1, . . . , c9), performing (22), at the candidate location (c1, . . . , c9), measurements on a wireless link (La, Lb) to at least one network node (2a, 2b), and providing (23) measurement results of the measurements to an entity (9). A corresponding method in an entity is also provided, an unmanned aerial vehicle, an entity, computer programs and computer program products.

22 Claims, 3 Drawing Sheets

(51) Int. Cl.
*H04W 24/02* (2009.01)
*H04W 24/10* (2009.01)

(52) U.S. Cl.
CPC .. *B64C 2201/027* (2013.01); *B64C 2201/122* (2013.01)

(58) Field of Classification Search
USPC ......................................................... 455/446
See application file for complete search history.

(56) References Cited

U.S. PATENT DOCUMENTS

2016/0323751 A1* 11/2016 Priest .................... H04W 16/18
2017/0126309 A1   5/2017 Rupasinghe et al.
2018/0292844 A1* 10/2018 Kosseifi .................. B60L 53/51

OTHER PUBLICATIONS

International Search Report and the Written Opinion of the International Searching Authority, issued in corresponding International Application No. PCT/EP2017/063132, dated Nov. 8, 2017, 14 pages.

M. Hashemi, L. Manholm, et. al., "Simulation performance of NLOS wireless backhaul using automatically aligned antennas with limited scan range" 10th European Conference on Antennas and Propagation (EuCAP) 2016, Apr. 10-15, 2016, 5 pages.

* cited by examiner

PLANNING DEPLOYMENT OF A NODE IN A COMMUNICATIONS NETWORK WITH A DRONE

CROSS REFERENCE TO RELATED APPLICATION(S)

This application is a 35 U.S.C. § 371 National Phase Entry Application from PCT/EP2017/063132, filed May 31, 2017, designating the United States, the disclosure of which is incorporated herein by reference in its entirety.

TECHNICAL FIELD

The technology disclosed herein relates generally to the field of communications network, and in particular to a method of planning deployment of a node in such a communications network. A method in an entity is also provided, an unmanned aerial vehicle, an entity, computer programs and computer program products.

BACKGROUND

Employment of nodes in a communications network providing wireless communication requires planning. For this, various network planning simulation tools, for instance cell planning tools, may be used in order find suitable positions for the deployment of new access nodes. For this, access to realistic and updated maps of cities/areas is required in order to identify suitable deployment locations. As an alternative or in addition to this, many network operators perform extensive drive test measurements to obtain estimates of the radio network performance, and to plan their new deployment locations based on the gathered measurements. Some disadvantages of the latter are that such measurement campaigns are not only costly but also time consuming.

With the use cases expected with new Fifth Generation (5G) there will be a need of massive deployment of communication nodes. Today's simulation tools and drive test equipment may be biased towards classical macro cell deployments, whereas future needs imply new site locations, new node routing topologies, new node environments, etc. Furthermore, deploying cellular networks with the aid of simulation tools is not only time-consuming but could also give inaccurate estimates of radio network performance, and also requires, as mentioned, access to detailed maps. In addition, e.g. with the emerging internet of things (IoT), it will be even more difficult and more critical to accurately estimate the network conditions, such as e.g. interference situation in the network, and without performing heavy drive-test measurements.

SUMMARY

An objective of the present disclosure is to address and improve various aspects for deployment of nodes in a communications network. A particular objective is to enable a simplified and more cost efficient way to plan the communications network. Another particular objective is to provide a flexible way of network planning for meeting different requirements and use cases. These objectives and others are achieved by the methods, devices, computer programs and computer program products according to the appended independent claims, and by the embodiments according to the dependent claims.

The objective is according to an aspect achieved by a method of planning deployment of a node in a communications network. The method performed by an unmanned aerial vehicle and comprises: flying to a candidate location, performing, at the candidate location, measurements on a wireless link to at least one network node, and providing measurement results of the measurements to an entity.

The method provides a number of advantages. For instance, the method of planning deployment of nodes in a communications network offers flexibility, time and cost saving compared to existing techniques. Furthermore, this method is less biased towards classical deployment scenarios and enables measurements at locations that are not easily accessible. Still further, the use of a drone enables the network planner to stay on the ground and control the drone remotely instead of climbing e.g. a mountain or building to find the best installation spot. This saves time and increases safety for the network planner. In comparison to system simulations, the method provides more accurate results and estimation of e.g. the interference and channel condition in the communications network. A drone or multiple drones can efficiently find the location that provides optimum access and backhaul performance.

The objective is according to an aspect achieved by a computer program for an unmanned aerial vehicle. The computer program comprises computer program code, which, when run on at processing circuitry of the unmanned aerial vehicle causes the an unmanned aerial vehicle to perform the method as above.

The objective is according to an aspect achieved by a computer program product comprising a computer program as above and a computer readable means on which the computer program is stored.

The objective is according to an aspect achieved by an unmanned aerial vehicle for planning deployment of a node in a communications network. The unmanned aerial vehicle is configured to: fly to a candidate location, perform, at the candidate location, measurements on a wireless link to at least one network node, and provide measurement results of the measurements to an entity.

The objective is according to an aspect achieved by a method of planning deployment of a node in a communications network. The method is performed by an entity and comprises receiving measurement results from an unmanned aerial vehicle, and determining, based at least on the received measurement results, a deployment location for the node.

The objective is according to an aspect achieved by a computer program for an entity. The computer program comprises computer program code, which, when run on at processing circuitry of the entity causes the entity to perform the method as above.

The objective is according to an aspect achieved by a computer program product comprising a computer program as above and a computer readable means on which the computer program is stored.

The objective is according to an aspect achieved by an entity for planning deployment of a node in a communications network. The entity is configured to receive measurement results from an unmanned aerial vehicle, and determine, based at least on the received measurement results, a deployment location for the node.

Further features and advantages of the embodiments of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 1:
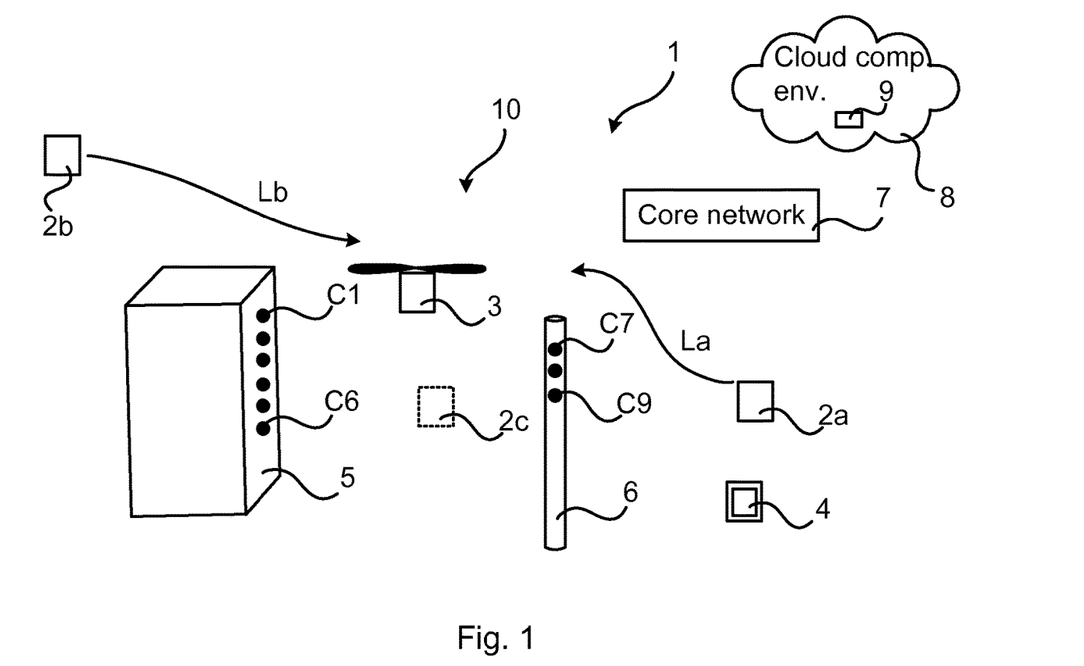
FIG. 1 illustrates an environment in which embodiments according to the present teachings may be implemented.

FIG. 1 illustrates an environment in which embodiments according to the present teachings may be implemented. FIG. 1 illustrates a communications network 1 providing wireless services to a number of communications devices 4. The communications network 1 comprises an access network 10, which may, for instance, be a 2G, 3G, 4G or 5G cellular radio access network (as a particular example Long Term Evolution, LTE, can be mentioned).

A first and a second network node 2a, 2b, in particular being access nodes of the access network 10 of the communications network 1, provide wireless connectivity to the communications devices 4. The first and second network nodes 2a, 2b are connected to the communications network 1 via a backhaul connection. The backhaul connection may be a wired connection or a wireless connection $L_a$, $L_b$, as illustrated in FIG. 1. In order to find a good location when deploying a new network node the wireless backhaul connection(s) of the network node 2a, 2b as well as the wireless connection(s) that the network node 2a, 2b provides to the communications devices 4 need to be considered.

The communications network 1 may also comprise a core network 7 comprising core network nodes (also denoted backbone nodes), such as e.g. mobility management nodes or subscriber databases. The communications network 1 may comprise, have access to or be interconnected with other network elements, for instance, cloud computing nodes of a cloud computing environment 8 comprising a number of cloud computing entities 9, or with other packet data networks, such as Internet.

The present teachings relate to network node 2a, 2b deployment in the communications network 1. The network node 2a, 2b may, for example, be a radio base station or a relay, and there are many candidate locations where a new network node 2a, 2b might be deployed. A number of such candidate locations are illustrated in FIG. 1: candidate locations c1 to c6 are on a wall of a building 5 and candidate locations c7 to c9 are on a lamp post 6. It is noted that various other locations, also unconventional locations besides the lamp posts, are conceivable.

According to an aspect of the present teachings, an unmanned aerial vehicle 3 (in the following also denoted drone) is used to measure the signal quality of links $L_a$, $L_b$ to/from network nodes 2a, 2b at each candidate location. This information is used for finding the best possible location, orientation and configuration of a new node, indicated in the FIG. 1 at reference numeral 2c. An example on this is to measure quality of the access link to/from the new node and/or the quality of the wireless backhaul link to/from the new node. This is then used to find the optimal location of the new node 2c and the best configuration to use.

In FIG. 1 the first and second network nodes 2a, 2b are existing nodes of the communications network 1. The drone 3 flies to the various candidate locations c1-c9, and at each candidate location c1-c9, the drone 3 performs measurements on the links $L_a$, $L_b$ to/from the existing first and second network nodes 2a, 2b. The measurement data may then be used in order to find the optimal node deployment for the total link between the first and second network nodes 2a, 2b, the total link being the link $L_a$ between the first network node 2a and the new node (placed at the best location found by the drone 3) and the link $L_b$ between the new node and the second network node 2b. It is noted that such total link may comprise several nodes and thus several (sub)links.

At least one controllable drone 3 flies to each location of a set of candidate locations c1-c9 for finding the best location for deployment of the new node 2c, which location might, for instance, be at the mentioned building wall 5, a building corner or the lamp post 6. The drone 3 can monitor one or many relevant measures for the radio network performance, e.g. link/channel quality, signal-to-interference-plus-noise ratio (SINR) or radio frequency (RF) power, for the relevant links $L_a$, $L_b$. For example, it can measure the link quality to/from the access and backhaul nodes, e.g. the first and second network nodes 2a, 2b. The drone 3 may be provided with a memory for storing the measured data and associated Global Positioning System (GPS) coordinates, altitude, and configuration. Altitude can for example be measured by an infrared transmitter. In other embodiments, the drone 3 may also directly communicate the information to an operator via wireless connectivity or it may send the data wirelessly to the cloud computing entity 9 of the cloud computing environment 8. The optimal location can be reported to the operator of the communications network 1 (and/or of the access network 10).

The drone 3 may be controlled automatically, e.g. by an entity of the access network 10, e.g. an internal software, or it may be controlled by a technician. The control comprises e.g. selecting and instructing the drone 3 on which path to travel.

The drone 3 may, in some embodiments, be a complete radio base station that is used to monitor a relevant traffic measure.

In some embodiments, the drone 3 is programmed to automatically, based on some algorithm, find one or a set of candidate locations. In other embodiments, the drone 3 is programmed to navigate to a set of candidate locations known forehand. In still other embodiments, the drone 3 is programmed to do both, i.e. to automatically find some of the candidate locations and to navigate to candidate locations determined beforehand.

The node deployment selection can comprise selecting one location and one node configuration of a set of test locations and node configurations.

The node location can be calculated by a smart algorithm based on the measurements taken on a set of test locations.

Many drones 3 can be operated simultaneously in order to optimize network configuration. In this case the measures may, for instance, be reported to a network optimization cloud computing resource, such as the illustrated cloud computing entity 9 of the cloud computing environment 8.

The various embodiments and features may be combined in many ways, other than the hitherto described and indicated. Further examples on combination of features are given in the following.

Figure 2:
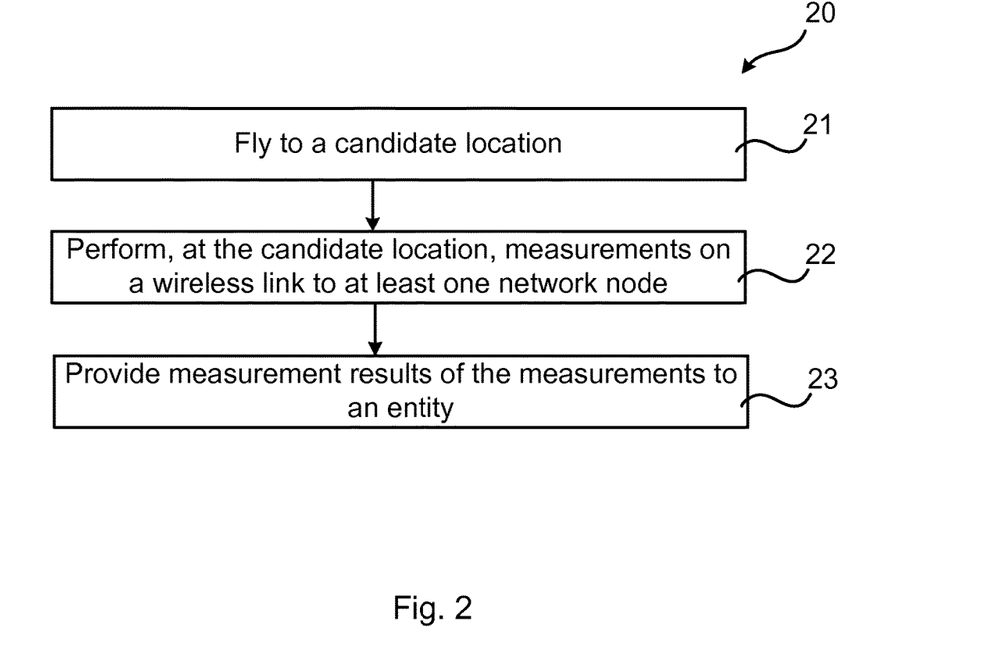
FIG. 2 illustrates a flow chart over steps of an embodiment of a method in an unmanned aerial vehicle for implementing embodiments of the present teachings.

FIG. 2 illustrates a flow chart over steps of an embodiment of a method in an unmanned aerial vehicle for implementing embodiments of the present teachings.

A method 20 of planning deployment of a node 2c in a communications network 1 is provided. The method 20 is performed by an unmanned aerial vehicle 3.

The method 20 comprises flying 21 to a candidate location c1, . . . , c9.

The method 20 comprises performing 22, at the candidate location c1, . . . , c9, measurements on a wireless link $L_a$, $L_b$ to at least one network node 2a, 2b.

The method 20 comprises providing 23 measurement results of the measurements to an entity 9. The entity 9 may, for instance and as has been mentioned, be a cloud computing entity, e.g. a virtual machine running on a server. In other embodiments, the entity 9 is a handheld device operated by a network planner. The network planner may, for instance, have such handheld device and also control the unmanned aerial vehicle 3 by this, or another, handheld device. The entity 9 may be an application and the handheld device may be e.g. a phone running the application 9, or the entity 9 may be a device dedicated only for the reception of the measurements performed by the unmanned aerial vehicle 3.

The method 20 provides a number of advantages. For instance, the method of planning deployment of nodes in a communications network offers flexibility, time and cost saving compared to existing techniques. Furthermore, the method 20 is less biased towards classical deployment scenarios and enables measurements at locations that are not easily accessible. Still further, the use of an unmanned aerial vehicle 3 enables the network planner to stay on the ground and control the unmanned aerial vehicle remotely instead of climbing e.g. a mountain or building to find the best installation spot. This saves time and increases safety for the network planner. In comparison to system simulations, the method 20 provides more accurate results and estimation of e.g. the interference and channel condition in the communications network. An unmanned aerial vehicle or multiple unmanned aerial vehicles can efficiently find the location that provides optimum access and backhaul performance.

In an embodiment, the performing 22 measurements comprise one or more of: link quality measurement, channel quality measurement, signal-to-interference-plus-noise ratio measurement, signal-to-noise ratio measurements, signal-to-interference ratio measurements and radio frequency power measurement. Various other measures on the wireless link are also conceivable.

In various embodiments, the method 20 comprises associating the measurement results to the candidate location at which they were taken. This may, for instance, be done by storing geographical coordinates, altitude etc. at the candidate location at which the unmanned aerial vehicle 3 performed the measurements.

In various embodiments, the providing 23 comprises one of: transmitting the measurement results to the network node 2a, 2b or storing the measurement results for subsequent downloading to the entity 9. The providing 23 may thus comprise the unmanned aerial vehicle 3 sending the measurement values directly to the entity 9, i.e. while still flying. In other embodiments, the unmanned aerial vehicle 3 flies to e.g. a docking station, and downloads the stored measurement values for provision directly or via other nodes to the entity 9.

In various embodiments, the method 20 comprises determining a suggested candidate location based on the measurement results and sending the suggested candidate location to the entity 9.

In various embodiments, the flying 21 comprises flying according to a preconfigured route or based on continuously received route instructions, or combinations thereof.

All or some of the routes may be predetermined based on coarse estimations on possible locations, and during the network planning the network planner may exclude some of these locations based on the received measurements. The network planner may then direct the unmanned aerial vehicle 3 to more promising locations.

Figure 3:
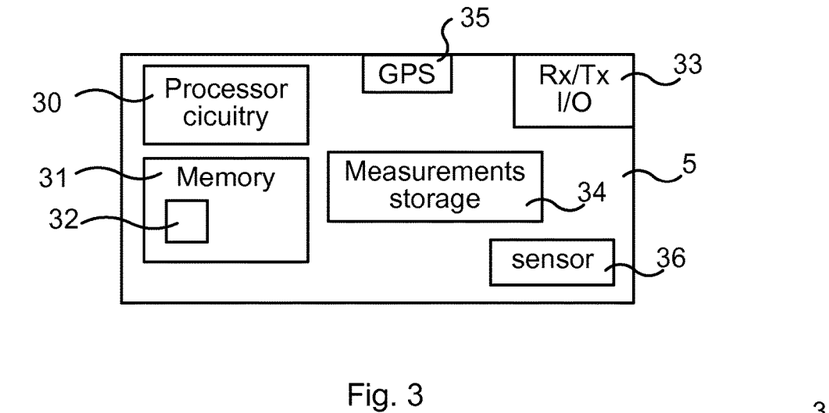
FIG. 3 illustrates schematically an unmanned aerial vehicle and means for implementing embodiments of the present teachings.

FIG. 3 illustrates schematically an unmanned aerial vehicle and means for implementing embodiments of the present teachings.

The unmanned aerial vehicle 3 may be provided with a communication unit such that it is able to communicate in a communications system 1 (as described e.g. in relation to FIG. 1). In FIG. 3 such communication unit is exemplified as an input/output device 33. The input/output device 33 may be an interface and may, for instance, comprise a protocol stack, for communication with other devices or entities, and receiving/transmitting circuitry (Rx/Tx). The input/output device 33 may be used for receiving data input and for outputting data, and/or receiving/transmitting wireless signaling.

The unmanned aerial vehicle 3 comprises processing circuitry 30, which may be any combination of one or more of a suitable central processing unit (CPU), multiprocessor, microcontroller, digital signal processor (DSP), etc., capable of executing software instructions stored in a computer program product 31, e.g. in the form of a storage medium 31. The processing circuitry 30 may further be provided as at least one application specific integrated circuit (ASIC), or field programmable gate array (FPGA).

The processing circuitry 30 is configured to cause the unmanned aerial vehicle 3 to perform a set of operations, or steps, e.g. as described in relation to FIG. 2. For example, the storage medium 31 may store the set of operations, and the processing circuitry 30 may be configured to retrieve the set of operations from the storage medium 31 to cause the unmanned aerial vehicle 3 to perform the set of operations. The set of operations may be provided as a set of executable instructions. The processing circuitry 30 is thereby arranged to execute methods as disclosed herein.

The storage medium 31 may also comprise persistent storage, which, for example, can be any single one or combination of magnetic memory, optical memory, solid state memory or even remotely mounted memory.

As described earlier, the drone 3 may be provided with a memory 34 for storing one or more of measured data and associated GPS coordinates, altitude, and configuration. The altitude can be measured by various devices, e.g. a GPS 35, or more generally a global navigation satellite system (GNSS) device, or a radar etc. The drone 2 may obtain the altitude (height) information in various different ways. In other embodiments, the drone 3 may also directly communicate the information to an operator via wireless connectivity or it may send the data wirelessly to the cloud computing entity 9 of the cloud computing environment 8. The optimal location can be reported to the operator of the communications network 1 (and/or of the access network 10).

The drone 3 may be equipped with a sensor 36 to measure signal strength or signal quality or any other measure on the wireless link to one or more network nodes.

The drone 3 may also comprise various conventionally included devices and means, e.g. an engine, antenna device etc., not described in detail herein.

An unmanned aerial vehicle 3 is provided for planning deployment of a node 2c in a communications network 1. The unmanned aerial vehicle 3 is configured to:

fly to a candidate location $c1, \ldots, c9$, perform, at the candidate location $c1, \ldots, c9$, measurements on a wireless link $L_a$, $L_b$ to at least one network node 2a, 2b, and provide measurement results of the measurements to an entity 9.

The unmanned aerial vehicle 3 may be configured to perform the above steps e.g. by comprising processing circuitry 30 and memory 31, the memory 31 containing instructions executable by the processing circuitry 30, whereby the unmanned aerial vehicle 3 is operative to perform the steps. That is, in an embodiment, an unmanned aerial vehicle 3 is provided. The unmanned aerial vehicle 3 comprises processing circuitry 30 and memory 31, the memory 31 containing instructions executable by the processing circuitry 30, whereby unmanned aerial vehicle is operative to: fly to a candidate location, perform, at the candidate location, measurements on a wireless link to at least one network node, and provide measurement results of the measurements to an entity.

In an embodiment, the unmanned aerial vehicle 3 is configured to perform one or more measurements selected among: link quality measurement, channel quality measurement, signal-to-interference-plus-noise ratio measurement, signal-to-noise ratio measurements, signal-to-interference ratio measurements and radio frequency power measurement.

In various embodiments, the unmanned aerial vehicle 3 is configured to associate the measurement results to the candidate location at which they were taken.

In various embodiments, the unmanned aerial vehicle 3 is configured to provide measurement results by transmitting the measurement results to the network node 2a, 2b or by storing the measurement results for subsequent downloading to the entity 9.

In various embodiments, the unmanned aerial vehicle 3 is configured to determine a suggested candidate location based on the measurement results and to send the suggested candidate location to the entity 9.

In various embodiments, the unmanned aerial vehicle 3 is configured to fly according to a preconfigured route or based on continuously received route instructions.

Figure 4:
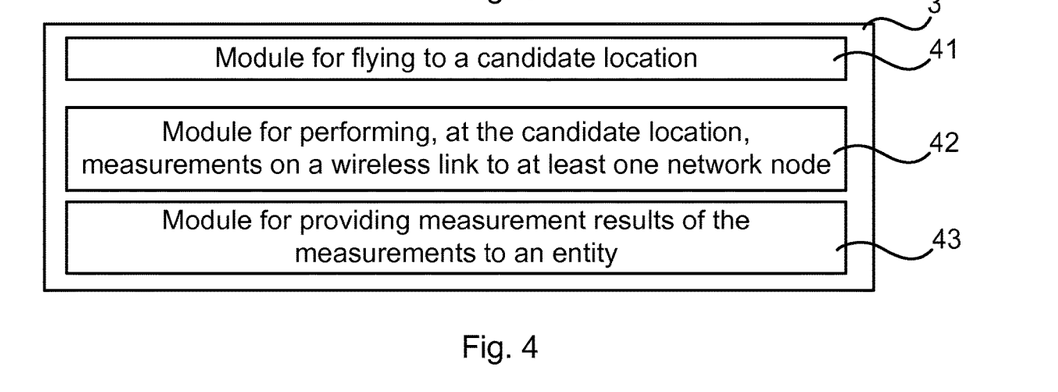
FIG. 4 illustrates an unmanned aerial vehicle comprising function modules/software modules for implementing embodiments of the present teachings.

FIG. 4 illustrates an unmanned aerial vehicle comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 20 that has been described in various embodiments.

An unmanned aerial vehicle 3 is provided for planning deployment of a node 2c in a communications network. The unmanned aerial vehicle 3 comprises a first module 41 for flying to a candidate location. Such first module 41 may, for instance, comprise processing circuitry adapted to process candidate location information and provide flying instructions for controlling movements and position of the unmanned aerial vehicle 3.

The unmanned aerial vehicle 3 comprises a second module 4 for performing, at the candidate location, measurements on a wireless link to at least one network node. The second module 4 may, for instance, comprise a sensor device (e.g. sensor device 6 described in relation to FIG. 3) and/or processing circuitry adapted for performing such measurements.

The unmanned aerial vehicle 3 comprises a third module 43 for providing measurement results of the measurements to an entity. Such third module 43 may, for instance, comprise transmitting circuitry or an output device for sending the measurement results over a wireless link to the entity. In other embodiments, the third module 3 may comprise storing the measurement results in a memory 34 for later downloading to the entity, in a wired or wireless manner.

It is noted that one or more modules 41, 42, 43 may be replaced by units.

Figure 5:
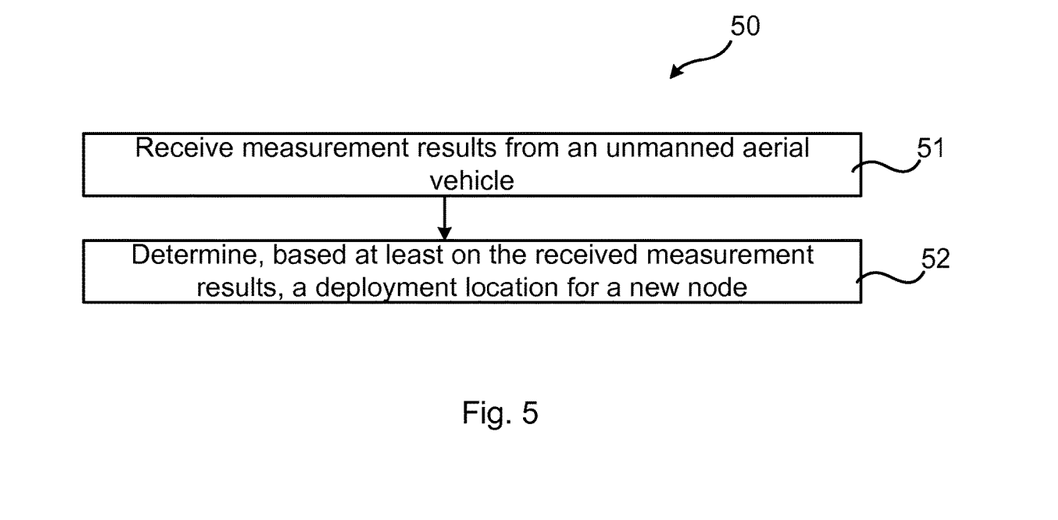
FIG. 5 illustrates a flow chart over steps of an embodiment of a method in an entity in accordance with the present teachings.

FIG. 5 illustrates a flow chart over steps of an embodiment of a method in an entity in accordance with the present teachings.

A method 50 of planning deployment of a node 2c in a communications network 1 is provided. The method 50 is performed by an entity 9, e.g. an entity run on a server, an entity run on a handheld device or an entity of a network node (e.g. an access node). The entity 9 may, for instance and as has been mentioned, be a cloud computing entity, e.g. a virtual machine running on a server. In other embodiments, the entity 9 is a handheld device, such as e.g. phone, smartphone etc., operated by a network planner. The network planner may, for instance, have such handheld device and also control the unmanned aerial vehicle 3 by this, or another, handheld device. The entity 9 may be an application and the handheld device may be e.g. a phone running the application 9, or the entity 9 may be a device dedicated only for the reception of the measurements performed by the unmanned aerial vehicle 3.

The method 50 comprises receiving 51 measurement results from an unmanned aerial vehicle 3.

The method 50 comprises determining 52, based at least on the received measurement results, a deployment location for the node 2c.

In an embodiment, the determining 52 further comprises determining, based at least on the received measurement results, one or both of: orientation of the node 2c at the deployment location and configuration of the node 2c.

In various embodiments, the method 50 comprises, prior to the receiving 51, controlling the unmanned aerial vehicle 3 so as to fly to candidate locations at which measurements providing the measurement results are to be performed.

In various embodiments, the determining 52 is further based on one or more of: state regulations, transmission power restrictions at candidate deployment locations. Several other parameters are possible. When determining the candidate locations criteria such as electromagnetic field (EMF) compliance regulations, accessibility for deployment personnel, accessibility of general public, landlord permissions, rental costs, power availability etc., can be part of defining the candidate locations. They may be part of the determining 52, but may preferably be performed before the determining phase, i.e. as a preparation for the measurements. Once the candidate locations have been established they are all considered suitable for deployment in view of e.g. these criteria. However, it then remains to determine the best location out of the candidate locations. The best location may then be based on the measurements, e.g. finding the location where both link La and Lb are strong/good in terms of e.g. link quality.

Figure 6:
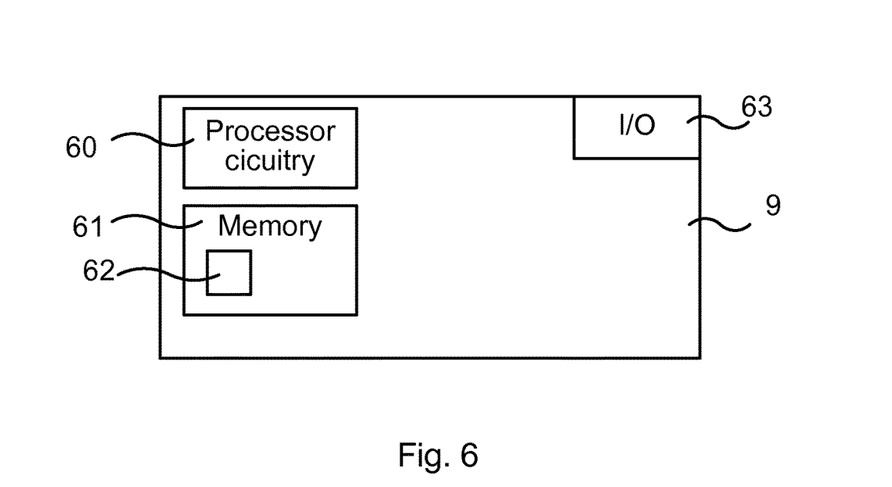
FIG. 6 illustrates schematically an entity and means for implementing embodiments of the method in accordance with the present teachings.

FIG. 6 illustrates schematically an entity and means for implementing embodiments of the method in accordance with the present teachings. As described earlier, the entity 9 may be an entity run on a server, an entity run on a handheld device (e.g. phone, smartphone etc.), an handheld device, a network node or an entity of a network node (e.g. an access node). The entity 9 may thus comprise more or less components.

The entity 9, but need not, may be provided with a communication unit such that it is able to communicate in a communications system 1 (as described e.g. in relation to FIG. 1). In FIG. 6 such communication unit is exemplified as an input/output device 63. The input/output device 63 may be an interface and may, for instance, comprise a protocol stack, for communication with other devices or entities, and receiving/transmitting circuitry (Rx/Tx). The input/output device 63 may be used for receiving data input and for outputting data, and/or receiving/transmitting wireless signaling.

The entity 9 comprises processing circuitry 60, which may be any combination of one or more of a suitable central processing unit (CPU), multiprocessor, microcontroller, digital signal processor (DSP), etc., capable of executing software instructions stored in a computer program product 61, e.g. in the form of a storage medium 61. The processing circuitry 60 may further be provided as at least one application specific integrated circuit (ASIC), or field programmable gate array (FPGA).

The processing circuitry 60 is configured to cause the entity 9 to perform a set of operations, or steps, e.g. as described in relation to FIG. 5. For example, the storage medium 61 may store the set of operations, and the processing circuitry 60 may be configured to retrieve the set of operations from the storage medium 61 to cause the entity 9 to perform the set of operations. The set of operations may be provided as a set of executable instructions. The processing circuitry 60 is thereby arranged to execute methods as disclosed herein.

The storage medium 61 may also comprise persistent storage, which, for example, can be any single one or combination of magnetic memory, optical memory, solid state memory or even remotely mounted memory.

An entity 9 for planning deployment of a node 2c in a communications network 1 is provided. The entity 9 is configured to:
receive measurement results from an unmanned aerial vehicle 3, and
determine, based at least on the received measurement results, a deployment location for the node 2c.

The entity 9 may be configured to perform the above steps e.g. by comprising processing circuitry 60 and memory 61, the memory 61 containing instructions executable by the processing circuitry 60, whereby the entity 9 is operative to perform the steps. That is, in an embodiment, an entity 9 is provided. The entity 9 comprises processing circuitry 60 and memory 61, the memory 61 containing instructions executable by the processing circuitry 60, whereby the entity 9 is operative to: receive measurement results from an unmanned aerial vehicle, and determine, based at least on the received measurement results, a deployment location for the node.

In an embodiment, the entity 9 is configured to determine based further on one or both of: orientation of the node 2c at the deployment location and configuration of the node 2c.

In an embodiment, the entity 9 is configured to, prior to the receiving, control the unmanned aerial vehicle 3 so as to fly to candidate locations at which measurements providing the measurement results are to be performed.

In an embodiment, the entity 9 is configured to determine based further on one or more of: state regulations, transmission power restrictions at candidate deployment locations, electromagnetic field compliance regulations, accessibility for deployment personnel, landlord permissions, rental costs, power availability. The candidate locations may thus be based on various aspects. When determining the candidate locations criteria such as EMF compliance regulations, accessibility for deployment personnel, accessibility of general public, landlord permissions, rental costs, power availability etc., can be part of defining the candidate locations, rather than in the determining phase. Once the candidate locations have been established they are all considered suitable for deployment in view of e.g. these criteria. However, it then remains to determine the best location out of the candidate locations. The best location may then be based on the measurements, e.g. finding the location where both link La and Lb are strong/good in terms of e.g. link quality.

Figure 7:
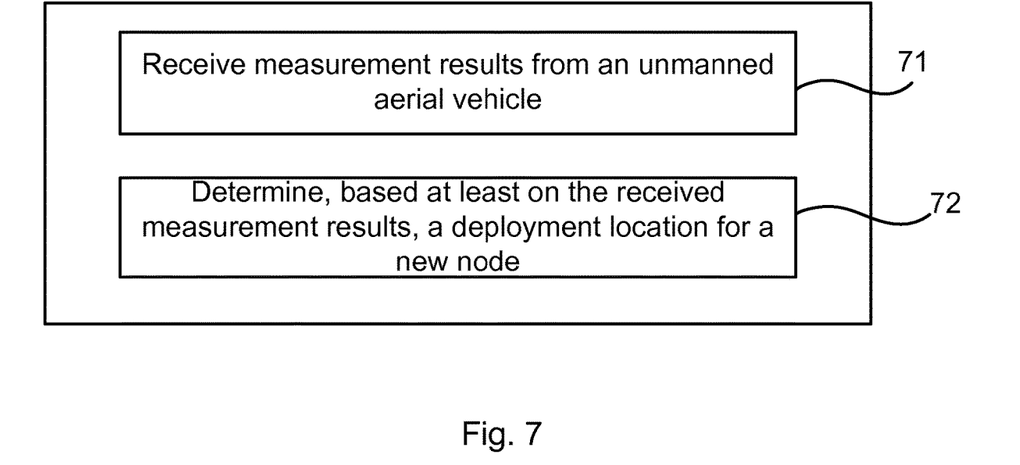
FIG. 7 illustrates an entity comprising function modules/software modules for implementing embodiments of the present teachings.

FIG. 7 illustrates an entity comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 50 that has been described in various embodiments.

An entity 9 is provided for planning deployment of a node in a communications network. The entity comprises a first module 71 for receiving measurement results from an unmanned aerial vehicle 3. Such first module 71 may, for instance, comprise receiving circuitry or an input device. In other embodiments, the first module 71 comprises a wired connection (e.g. cable) for receiving measurement results as a download from the unmanned aerial vehicle 3.

The unmanned aerial vehicle 3 comprises a second module 72 for determining, based at least on the received measurement results, a deployment location for the node. Such second module 72 may, for instance, comprise processing circuitry adapted for such determining.

It is noted that one or both modules 71, 72 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:
1. A method of planning deployment of a node in a communications network, the method comprising:
an unmanned aerial vehicle flying to a candidate location;
the unmanned aerial vehicle performing, at the candidate location, measurements of radio network performance of a wireless link between the unmanned aerial vehicle and at least one network node;

the unmanned aerial vehicle determining a global navigation satellite system (GNSS) coordinate associated with the candidate location;

the unmanned aerial vehicle associating the measurements of the radio network performance of the wireless link to the determined GNSS coordinate; and the unmanned aerial vehicle providing measurement results of the measurements to an entity, wherein the measurements of the radio network performance include (i) a first measurement of radio network performance of a first wireless link between the unmanned aerial vehicle and a first network node and (ii) a second measurement of radio network performance of a second wireless link between the unmanned aerial vehicle and a second network node, and the deployment of the node is planned based on a combination of the first measurement and the second measurement.

2. The method as claimed in claim 1, wherein the performing measurements comprises performing one or more of: link quality measurement, channel quality measurement, signal-to-interference-plus-noise ratio measurement, signal-to-noise ratio measurements, signal-to-interference ratio measurements and radio frequency power measurement.

3. The method as claimed in claim 1, wherein the providing comprises one of: transmitting the measurement results to the network node or storing the measurement results for subsequent downloading to the entity.

4. The method as claimed in claim 1, comprising determining a suggested candidate location based on the measurement results and sending the suggested candidate location to the entity.

5. The method as claimed in claim 1, wherein the flying comprises flying according to a preconfigured route or based on continuously received route instructions.

6. A computer program product comprising a non-transitory computer readable medium storing a computer program for an unmanned aerial vehicle comprising instructions which, when executed on processing circuitry of the unmanned aerial vehicle, cause the unmanned aerial vehicle to perform the method according to claim 1.

7. An unmanned aerial vehicle for planning deployment of a node in a communications network, the unmanned aerial vehicle being configured to:

fly to a candidate location;

perform, at the candidate location, measurements of radio network performance of a wireless link between the unmanned aerial vehicle and at least one network node;

determine a global navigation satellite system (GNSS) coordinate associated with the candidate location;

associate the measurements of the radio network performance of the wireless link to the determined GNSS coordinate; and provide measurement results of the measurements to an entity, wherein the measurements of the radio network performance include (i) a first measurement of radio network performance of a first wireless link between the unmanned aerial vehicle and a first network node and (ii) a second measurement of radio network performance of a second wireless link between the unmanned aerial vehicle and a second network node, and the deployment of the node is planned based on a combination of the first measurement and the second measurement.

8. The unmanned aerial vehicle as claimed in claim 7, configured to perform one or more measurements selected from among: link quality measurement, channel quality measurement, signal-to-interference-plus-noise ratio measurement, signal-to-noise ratio measurements, signal-to-interference ratio measurements and radio frequency power measurement.

9. The unmanned aerial vehicle as claimed claim 7, configured to provide measurement results by transmitting the measurement results to the network node or by storing the measurement results for subsequent downloading to the entity.

10. The unmanned aerial vehicle as claimed in claim 7, configured to determine a suggested candidate location based on the measurement results and to send the suggested candidate location to the entity.

11. The unmanned aerial vehicle as claimed in claim 7, configured to fly according to a preconfigured route or based on continuously received route instructions.

12. A method of planning deployment of a node in a communications network, the method being performed by an entity and comprising:

receiving measurement results from an unmanned aerial vehicle; and determining, based at least on the received measurement results, a deployment location for the node, wherein the measurements results are results of measurements of radio network performance of a wireless link between the unmanned aerial vehicle and at least one network node, and the measurements of the radio network performance of the wireless link between the unmanned aerial vehicle and the at least one network node are associated to a global navigation satellite system (GNSS) coordinate associated with the candidate location, wherein the measurements of the radio network performance include (i) a first measurement of radio network performance of a first wireless link between the unmanned aerial vehicle and a first network node and (ii) a second measurement of radio network performance of a second wireless link between the unmanned aerial vehicle and a second network node, and the deployment of the node is planned based on a combination of the first measurement and the second measurement.

13. The method as claimed in claim 12, wherein the determining further comprises determining, based at least on the received measurement results, one or both of: orientation of the node at the deployment location and configuration of the node.

14. The method as claimed in claim 12, comprising, prior to the receiving, controlling the unmanned aerial vehicle so as to fly to candidate locations at which measurements providing the measurement results are to be performed.

15. The method as claimed in claim 12, wherein the determining is further based on one or more of: state regulations, and transmission power restrictions at candidate deployment locations.

16. A computer program product comprising a non-transitory computer readable medium storing a computer program for an entity comprising instructions which, when executed on processing circuitry of the entity, cause the entity to perform the method according to claim 12.

17. An entity for planning deployment of a node in a communications network, the entity being configured to:

receive measurement results from an unmanned aerial vehicle; and determine, based at least on the received measurement results, a deployment location for the node, wherein the measurements results are results of measurements of radio network performance of a wireless link between the unmanned aerial vehicle and at least one network node, and the measurements of the radio network performance of the wireless link between the unmanned aerial vehicle and the at least one node are associated to a global navigation satellite system (GNSS) coordinate associated with the candidate location, wherein the measurements of the radio network performance includes (i) a first measurement of radio network performance of a first wireless link between the unmanned aerial vehicle and a first network node and (ii) a second measurement of radio network performance of a second wireless link between the unmanned aerial vehicle and a second network node, and the deployment of the node is planned based on a combination of the first measurement and the second measurement.

18. The entity as claimed in claim 17, configured to determine based further on one or both of: orientation of the node at the deployment location and configuration of the node.

19. The entity as claimed in claim 17, configured to, prior to the receiving, control the unmanned aerial vehicle so as to fly to candidate locations at which measurements providing the measurement results are to be performed.

20. The entity as claimed in claim 17, configured to determine based further on one or more of: state regulations, transmission power restrictions at candidate deployment locations, electromagnetic field compliance regulations, accessibility for deployment personnel, landlord permissions, and rental costs, power availability.

21. The method as claimed in claim 1, the method further comprising obtaining predetermined candidate locations, wherein the candidate location is one of the predetermined candidate locations.

22. The method as recited in claim 21, further comprising the unmanned aerial vehicle finding the predetermined candidate locations.

* * * * *